Patented Aug. 29, 1944

2,357,187

UNITED STATES PATENT OFFICE 2,357,187

PROCESS FOR THE MANUFACTURE OF HYDROPHILIC POLYMERIZATION PRODUCTS OF THE SUPERPOLYAMIDE TYPE

Max Hagedorn, Dessau, Germany; vested in the Alien Property Custodian

No Drawing. Application September 5, 1940, Serial No. 355,455. In Germany July 18, 1939

2 Claims. (Cl. 260—78)

This invention relates to the manufacture of hydrophilic synthetic linear condensation products of the superpolyamide type.

In my copending U. S. patent application Ser. No. 355,454, filed Sept. 5, 1940, it has been shown that by condensation of ω-amino carboxylic acid with at least 4 carbon atoms between the amino- and the carboxyl groups with the hydrohalides of ω-amino carboxylic acids with at most 3 carbon atoms between the amino- and the carboxyl groups hydrophilic superpolyamides are obtained which are swellable or colloidally soluble in water and assume the state of sol in an aqueous solution at elevated temperature, but become a gel on cooling.

Example 70 grams hexamethylene diammonium sebacate (2 mols) are thoroughly mixed with 30 grams glycocolethylester hydrochloride and heated after careful displacement of the air by carbon dioxide in a carbon dioxide atmosphere at 190–200° C. for 17 hours. The clear melt solidifies after cooling into a red-brown resin. In the heat it is clearly soluble in water with dark red color. The solution solidifies into a clear paste after cooling. This high polymeric condensation product is suitable as textile auxiliary agent, as diluent for printing inks and similar purposes.

What I claim is:

1. Process for the manufacture of hydrophilic synthetic linear polyamides which comprises heating hexamethylenediamine sebacate together with glycocolethylester hydrochloride in substantially equal molar proportions, until condensation occurs.

2. As a new composition of matter hydrophilic synthetic linear superpolyamide essentially containing in polymerized form linear units of hexamethylenediammonium sebacate and glycocolethylester hydrochloride in substantially equal molar proportions.

MAX HAGEDORN.